Sept. 6, 1927.  E. E. MEISEKOTHEN  1,641,685
DRY BATTERY CONSTRUCTION
Filed Aug. 28, 1925  2 Sheets-Sheet 1
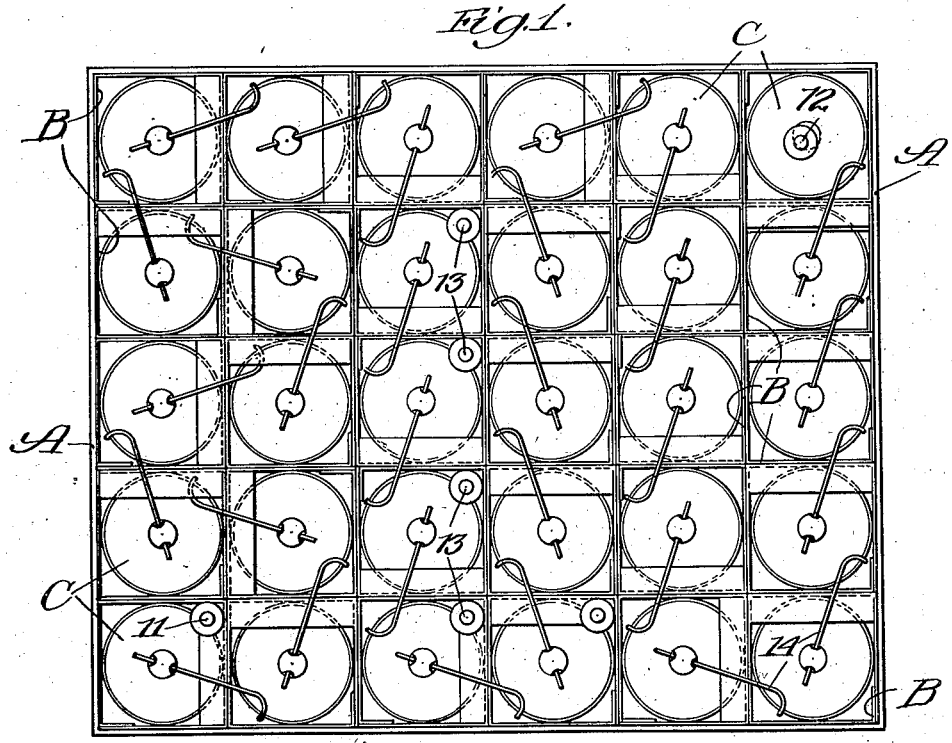
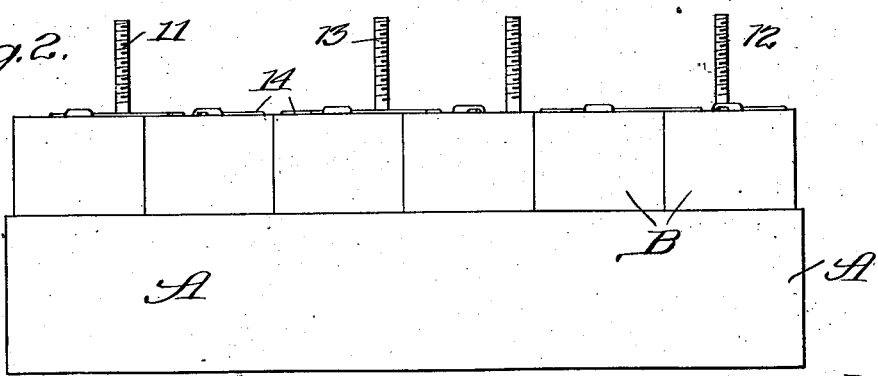
Inventor:
Edwin E. Meisekothen,
By Dyrenforth, Lee, Chritton & Wiles,
Attys.

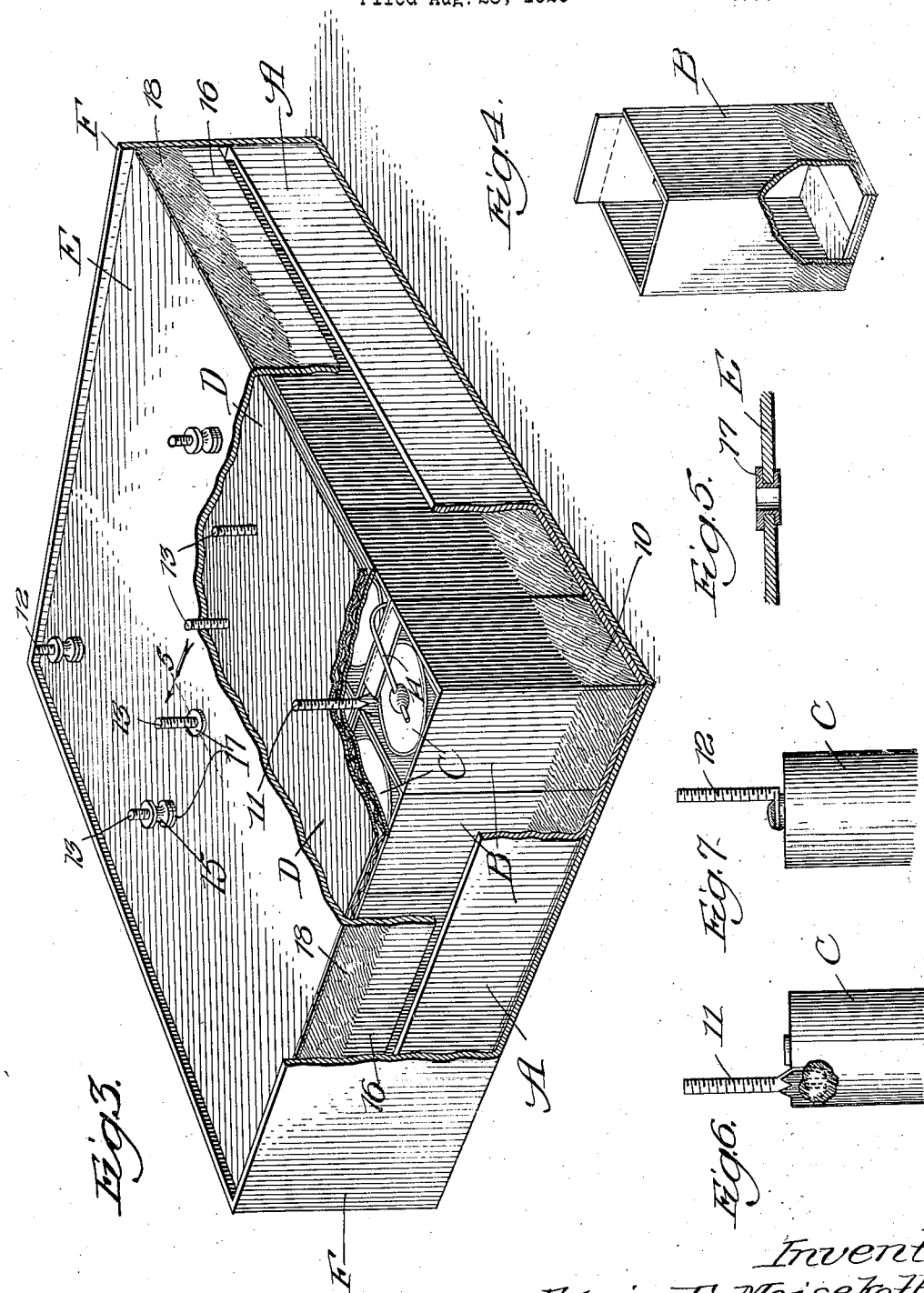

Patented Sept. 6, 1927.

1,641,685

UNITED STATES PATENT OFFICE.

EDWIN E. MEISEKOTHEN, OF MADISON, WISCONSIN, ASSIGNOR TO FRENCH BATTERY COMPANY, OF MADISON, WISCONSIN, A CORPORATION OF WISCONSIN.

DRY-BATTERY CONSTRUCTION.

Application filed August 28, 1925. Serial No. 53,069.

This invention relates to improvements in dry battery construction; and more especially to dry batteries having a plurality of cells usually more than six, such as, for example, are used for "B" batteries in radio work. Such batteries usually have at least twelve cells; and frequently as many as twenty-four or thirty. The construction of such a battery with a relatively large number of cells involves many difficulties and problems. The individual cells must be securely housed or packed, connected, and the whole battery properly sealed and protected.

By the use of my invention, it is possible to construct such a battery with a relatively large number of cells, quickly and cheaply, and produce an efficient, durable, and neat battery. Moreover, the improved battery dispenses with the use of pitch, wax, or other sealing compound in the upper portion of the main container and between cells, thus affording a lighter weight battery and further reducing the cost.

Other features and advantages of my invention will appear more fully as I proceed with my specification.

In that form of device embodying the features of my invention, shown in the accompanying drawings, Figure 1, is a top plan view of a partially constructed battery; Fig. 2 is a similar view in side elevation; Fig. 3 is a view in perspective of the complete battery, showing portions broken away; Fig. 4 is a view in perspective of one of the individual cell cartons; Fig. 5 is a view taken as indicated by the line 5 of Fig. 3, Fig. 6 is a view in side elevation showing one of the binding posts connected to the zinc shell of a cell; and Fig. 7 is a similar view of one of the binding post terminals connected to the carbon element of a cell.

As shown in the drawings, (Fig. 4) B indicates one of the individual cell cartons preferably formed of light cardboard or heavy stiff paper. This carton is preferably rectangular in shape and may be constructed in any desired manner. For example, it may be made in accordance with the disclosure in Figs. 6 to 8, inclusive, in my copending patent application Serial No. 21,501, filed April 8, 1925. In view of the disclosure in that application, it is not necessary to describe in detail the construction and formation of such a carton here. The particular form and construction of the individual carton forms no part of the present invention. Such a carton, as has been stated, may be formed of cardboard or stiff paper in any desired manner. In general, it may be stated that such a carton may be formed from a blank of paper folded to form such a rectangular shaped carton or box as indicated. In case of oozing or leakage of a cell, the individual carton prevents the electrolyte from reaching adjoining cells.

A indicates a rectangular flat box preferably made of cardboard or other suitable material, the sides of which are substantially one-half the height of an individual cell carton B. The box A is just large enough to contain the desired number of such cell cartons for the formation of a complete battery.

In the first step in the making of the battery, the box A is filled with individual cartons B, here shown as thirty in number, the same being fastened in the box in any convenient manner such as by glue on their bottoms and around the outer edges as indicated by 10.

The box A with the cartons B in place is then preferably paraffined in any suitable manner as by dipping. The cells C are then put in place, one in each carton, and connected in the usual manner.

After the cells have been put in place and connected, a flat rectangular shaped piece of filler material such as corrugated cardboard D is then placed on the top of the cells. 11 and 12 indicate the terminal binding posts, and 13, 13, are intermediate binding posts to permit connections for lesser voltages than the complete battery. Suitable holes are provided in the sheet D to accommodate all the binding posts, 11, 12 and 13. The terminal 11 is connected to the zinc shell of one of the cells, and the terminal 12 to the carbon element of another, the wires 14 connecting all the cells in series between the two terminals 11 and 12.

After the sheet D has been put in place, the cover E is placed over the whole as shown and held in place by the nuts 15 on the binding posts. The sides 16 of the cover E do not quite meet the sides of the box A when the cover is in place. The cover E is provided with holes to accommodate the binding posts 11, 12 and 13, and each of these holes is provided with an eyelet or rivet 17, (see Fig. 5) having its upper end or flange somewhat wider or larger than its lower end in order to give a better contact with the nut 15 and to prevent the same from pulling through.

After the cover E is in place, the whole battery is then inverted and the outer box F slipped on and held in place in any suitable manner, such as, for example, by a margin of glue 18 around its inner edge. The sides of the box F are high enough so that they will extend a slight distance, for example, $\frac{3}{32}$ of an inch, above the cover E when all the members are in place.

The foregoing detailed description has been given for clearness of understanding only, and no unnecessary limitations should be understood therefrom, but the appended claims should be construed as broadly as permissible in view of the prior art.

What I claim as new, and desire to secure by Letters Patent, is:

1. A battery comprising: an outer box having an open top; a shallow inner box confined in the lower portion of said outer box; individual cell-cartons of rectangular form having their lower portions nested in said shallow box; an inverted open sided upper box telescopically received within the upper portion of said outer box and having its depending flanges embracing the upper portions of said cell-cartons; electrically connected cells within said cell-cartons, some of said cells being equipped with terminals extending through perforations with which the top wall of said upper box is provided; and nuts on said terminals.

2. A battery comprising: an outer box having an open top; a shallow inner box confined in the lower portion of said outer box; individual cell-cartons of rectangular form having their lower portions nested in said shallow box; an inverted open-sided upper box telescopically received within the upper portion of said outer box and having its depending flanges embracing the upper portions of said cell-cartons and adhesively joined to the inner surface of the upper portion of the outer box; a filler board within said upper box adjacent the top wall thereof; electrically connected cells within said cell-cartons, some of said cells being equipped with terminals extending through perforations with which said filler board and the top wall of said upper box are provided; and nuts on said terminals.

3. The method of constructing a dry battery which comprises: forming individual cell-cartons of rectangular form; nesting the lower portions of said cartons in a shallow box and introducing cells into said cartons, some of said cells being equipped with upwardly extending terminals; connecting the ends of said cells electrically; applying an inverted shallow upper box to cover and embrace the upper portions of said cells and cell-cartons, with said terminals projecting through perforations in the top wall of said upper box; applying nuts to said terminals; and introducing the assembled structure into an open-sided outer box and adhesively joining the inner structure to the inner surface of the outer box.

4. The method of constructing a dry battery which comprises: nesting the lower end portions of individual rectangular cell-cartons within a shallow box and introducing cells into said individual cartons, some of said cells being provided with upwardly extending terminals; applying an inverted shallow box containing a filler board adjacent its top wall, said filler board and top wall being provided with perforations through which said terminals project; and introducing the assembled structure into an open-sided outer box and adhesively joining the depending flange of the upper inner box to the inner surface of the outer box.

In testimony whereof, I have hereunto set my hand and seal this 20th day of August, 1925.

EDWIN E. MEISEKOTHEN.